(12) United States Patent
Nelson et al.

(10) Patent No.: US 7,842,251 B2
(45) Date of Patent: Nov. 30, 2010

(54) CATALYST PARTICULATE DIVERTER

(75) Inventors: Norman D Nelson, Akron, OH (US); George D. Burges, Mentor, OH (US)

(73) Assignee: Babcock & Wilcox Power Generation Group, Inc.

( * ) Notice: Subject to any disclaimer, the term of this patent is extended or adjusted under 35 U.S.C. 154(b) by 734 days.

(21) Appl. No.: 11/851,443

(22) Filed: Sep. 7, 2007

(65) Prior Publication Data
US 2009/0065414 A1    Mar. 12, 2009

(51) Int. Cl.
*B01D 50/00*    (2006.01)
(52) U.S. Cl. ...................................................... 422/177

(58) Field of Classification Search ................. 422/167, 422/177, 180
See application file for complete search history.

(56) References Cited

FOREIGN PATENT DOCUMENTS
JP        2002219336 A  *  8/2002
* cited by examiner

*Primary Examiner*—Tom Duong
(74) *Attorney, Agent, or Firm*—Michael J. Seymour; Eric Marich

(57) ABSTRACT

The present invention generally relates to devices for diverting contaminants into catalyst blocks; and in particular to devices for diverting particulate matter such as powdered and/or solid contaminants away from spaces around and between catalyst blocks.

7 Claims, 4 Drawing Sheets

CATALYST PARTICULATE DIVERTER

FIELD AND BACKGROUND OF THE INVENTION

1. Field of the Invention

The present invention generally relates to devices for diverting particulate matter away from spaces around and between catalyst blocks used in selective catalytic reduction (SCR) devices to remove nitrogen oxides ($NO_x$) from flue gases and, in particular, to particulate diverter devices for diverting powdered and/or solid particulate matter away from spaces around and between catalyst blocks used in such SCRs.

2. Description of the Related Art

The by-products of fossil fuel combustion include, among other things, flue gases and generally an ash component. The ash component of a fossil fuel combustion process is particularly notable in the case of coal combustion, and to a lesser extent in the combustion of oil. The combination of the ash and gaseous combustion products can, if discharged in sufficient quantity, cause significant air pollution. The ash component of such flue gases generally contain silicon dioxide, aluminum oxide, and ferric oxide ash particles, whereas the gaseous component of the flue gases contain, at a minimum, carbon dioxide, sulfur oxides ($SO_x$), and nitrogen oxides ($NO_x$).

A variety of methods and/or devices are used to remove, for example, particulates, sulfur oxides ($SO_x$) and nitrogen oxides ($NO_x$). The problems of particulate or ash removal and disposal from flue gases can be significant in the case of the combustion of coal, since about 80% to about 90% of the ash generated by coal combustion processes remains in the flue gases. Current energy policy in the United States is based on expanded use of coal in utility and industrial applications. Such expanded use of coal can not lead to a compromise in environmental requirements for clean air. Accordingly, advanced control technologies are needed to control the increase in pollutant emissions of coal combustion.

Electrostatic precipitators and other particulate collection devices such as fabric filter houses (baghouses) have been used to effectively remove such particulates from flue gases prior to atmospheric release. U.S. Pat. No. 4,309,386 discloses a hot catalytic baghouse which simultaneously removes particulate material and reduces the $NO_x$ emissions. This patent describes coating the catalyst onto the fabric of the baghouse filter media including the use of a fabric filter in which the catalyst is woven into the fabric. U.S. Pat. No. 4,793,981 describes the use of a hot catalytic baghouse which simultaneously collects sulfur oxides, nitrogen oxides and particulates.

U.S. Pat. No. 4,602,673 discloses an apparatus for preheating combustion air while simultaneously reducing $NO_x$ contained in the flue gas. By combining a catalytic reactor with an air heater, a compact device is possible according to that patent. However, the catalyst will have to be replaced frequently because of erosion of the catalyst due to ash and/or dust build-up. In addition, fly ash erosion will reduce the effective life of an SCR catalyst.

SCRs using catalyst blocks are often used in applications where $NO_x$ removal from flue gases is needed. In such cases, the SCR catalyst blocks are placed within the SCR reactor through which the combustion flue gases are conveyed. In order to remain effective, the catalyst should be protected from accumulation of particulate contaminants, which may deposit on the catalyst or otherwise restrict gas flow to and/or through the catalyst. One particular area of concern is the gaps or spaces between individual catalyst blocks. If particulate accumulates in a manner that fills these gaps and bridges the spaces between catalyst blocks, flue gas flow to the surface area of the catalyst is limited, thereby degrading the SCR's relative effectiveness for $NO_x$ removal.

This problem has, to date, been addressed by installing thin strips of metal called ash shields (also known as "wall seals", "catalyst block seals", or "layer caps") around catalyst blocks. The size, location and other design parameters of the strips are chosen so that ash remains entrained in the flue gas and does not settle on the one or more catalyst blocks. In general, ash shields are installed by tack welding metal strips to one or more appropriate locations of the catalyst block support frame. Alternatively, or in addition to, ash shields can be tack welded to the SCR casing, both activities being performed after the catalyst blocks are in place. Such ash shields are inconvenient because they are welded into place, prevent screen removal, and need to be removed prior to cleaning and/or replacing the one or more catalyst blocks as screen removal is generally necessary for access the catalyst blocks.

An additional prior practice has been to overlap such ash shields with the catalyst block support frame. However, this is also not desirable because the catalyst blocks need to be cleaned and/or replaced periodically. Catalyst cleaning can be accomplished only if a screen is removed from the top of the catalyst. The screen generally cannot be removed until the ash shield is destructively removed.

In addition to the foregoing, prior art ash shield designs are also subject to installation and operational damage. Welding such ash shields with the catalyst in place also exposes the sensitive catalyst surface to the risk of weld splatter, which can cause catalyst damage and/or degradation.

Given the above, a need exists in the art for devices and methods of diverting particulate contaminants in an SCR without the use of welded ash shields.

SUMMARY OF THE INVENTION

The present invention generally relates to an apparatus for diverting contaminant matter into catalyst blocks used in selective catalytic reduction (SCR) devices to remove nitrogen oxides ($NO_x$) from flue gases and, in particular, to particulate diverter devices for diverting powdered and/or solid particulate matter away from spaces around and between catalyst blocks used in such SCRs.

Accordingly, one aspect of the present invention is drawn to a particulate diverter comprising: a wall-contacting portion having a first end and a second end, the wall-contacting portion being designed to operatively engage at least one wall surface; a tensioning portion having a first end and a second end, the first end of the tensioning portion being operatively joined to the second end of the wall-contacting portion, and where the tensioning portion is designed to maintain contact between the at least one wall surface and the wall-contacting portion, and an L-shaped anchor having a first end and a second end, the first end of the L-shaped anchor being operatively joined to the second end of the tensioning portion, and where the L-shaped anchor is designed to prevent dislodging of the particulate diverter, wherein the combination of the wall-contacting portion, the tensioning portion and the L-shaped anchor portion form a particulate diverter that is capable of diverting particulate matter.

Another aspect of the present invention is drawn to a particulate diverter comprising: a first anchoring portion having a first end and a second end; a V-shaped tensioning portion having a first end and a second end, the first end of V-shaped tensioning portion being operatively joined to the second end of the first anchoring portion; and a second anchoring portion having a first end and a second end, the first end of the second anchoring portion being operatively joined to the second end of the V-shaped tensioning portion, wherein the V-shaped tensioning portion is designed to permit the first and second anchoring portions to maintain contact with at least one surface of adjacent catalysts blocks, and wherein the combination of the first and second anchoring portions and the V-shaped tensioning portion form a particulate diverter that is capable of diverting particulate matter.

In yet another aspect of the present invention, there is provided a particulate diverter comprising: a flat bar portion having a first end and a second end, the first end and second end of the flat bar portion maintaining contact with at least one surface of adjacent catalysts blocks, an anchor portion comprising of at least two sides being operatively joined to the flat bar portion between the first end and second end, wherein opposite sides of the anchoring portion maintain contact with at least one surface of adjacent catalyst blocks, and the flat bar and anchor portion form a T-shape capable of diverting particulate matter.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
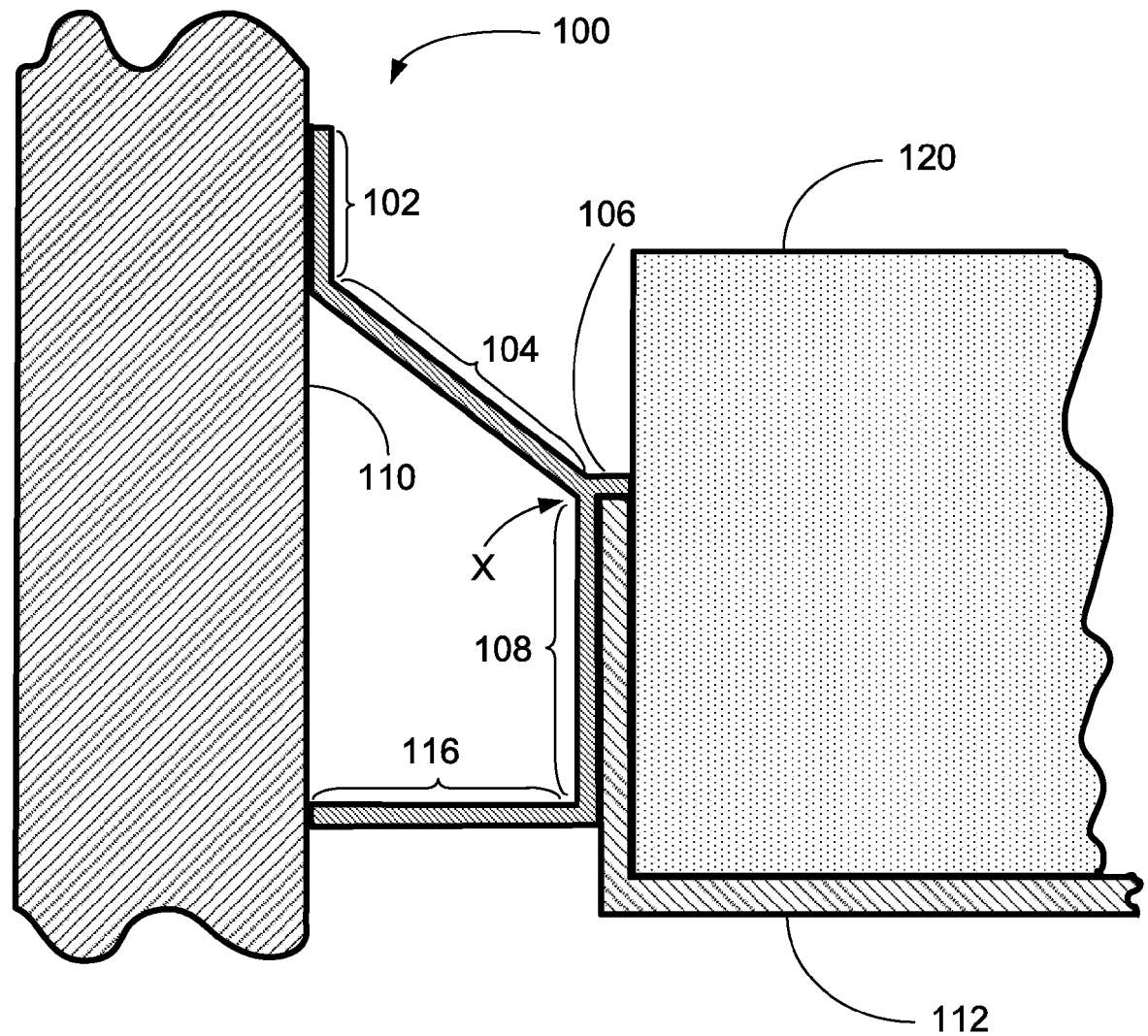
FIG. 1 is an illustration of a wall mounted particulate diverter according to one embodiment of the present invention.

Referring to the drawings generally, wherein like reference numerals designate the same or functionally similar elements throughout the several drawings, and to FIG. 1 in particular, there is shown a first embodiment of a particulate diverter device, alternatively a catalyst particulate diverter (CPD) (when used in conjunction with catalyst blocks) according to the present invention, and generally designated 100. The primary function of the CPD 100 is to divert powdered or solid contaminants such as flyash away from spaces around and between catalyst blocks used in SCRs. One or more CPDs 100 designed to divert particulate matter into the one or more catalyst blocks present in, for example, a selective catalytic reduction (SCR) enclosure, would be typically employed. While not wishing to be bound to any one set of advantages, the CPDs 100 of the present invention permit reduced installation time, labor and expense while providing a means for diverting particulate matter away from spaces around and between a catalyst block 120 and the casing of an SCR enclosure. In another embodiment, the CPDs 100 of the present invention provide a means for diverting particulate matter away from spaces around and between adjacent catalyst blocks 120 within an SCR enclosure. In one embodiment, the CPDs of the present invention are installed at the same time the SCR enclosure is filled with catalyst blocks. In another embodiment, previously filled SCR enclosures can be retrofitted with CPDs according to the present invention so as to potentially lengthen the service life of the catalyst blocks contained therein.

In use, the CPDs of the present invention entail different embodiments designed to fit and/or seal different portions of the SCR enclosure and the catalyst blocks, or adjacent catalyst blocks. In one embodiment, a CPD according to the present invention is designed to create a seal, or particulate diverting means, between a catalyst block located next to an interior surface of the SCR enclosure. This embodiment is detailed in FIG. 1.

As shown in FIG. 1, a first embodiment of a CPD 100 comprises a wall-contacting portion 102, a tensioning portion 104, a lip 106, and an L-shaped anchor 108. Lip 106 is integrally connected to CPD 100 in any suitable position so as to operatively engage a catalyst block holding tray or catalyst support means of an SCR enclosure. As is shown in FIG. 1 CPD 100 is located between an exterior wall 110 and a catalyst block holding tray 112. In operation, CPD 100 operatively engages the interior surface of, for example, external wall 110 via wall-contacting portion 102, a tensioning portion 104 and L-shaped anchor 108/116. CPD 100 is maintained in place via the operative engagement of lip 106 with catalyst block holding tray 112. Tension is generated by CPD 100 due to the fact the resting arc X of CPD 100 is smaller than arc X when CPD 100 is placed between wall 110 and catalyst block holding tray 112.

In one embodiment, resting arc X has an angle of about 95 to about 170 degrees, or from about 100 to about 150 degrees, or even from about 110 to about 145 degrees.

The leg portion 116 of L-shaped anchors 108/116 allows the catalyst blocks to be pre positioned, improving ease of catalytic block installation and reducing maintenance outage times. The L-shaped anchors 108/116 and wall contacting portion 102 may also be altered to fit over any obstructions such as, but not limited to, soot blowers and sonic horns for example. Optionally, a gasket material may be placed between the L-shaped anchor 108/116 and the catalyst block holding tray to reduce the rate of particulate matter leakage past the CPD 100.

CPD 100 is generally assembled from one or more pieces of metal via any suitable assembly process (welding, brazing, riveting, adhesive, etc.) to yield a desired shape that can be tension mounted, as noted above, in an SCR enclosure. In one embodiment, CPD 100 is formed from a single sheet of metal that is suitably bent to yield CPD 100. In another embodiment, CPD 100 can be formed from a single sheet of metal that is suitably bent to yield all the elements of CPD 100 except for lip 106. In this embodiment, lip 106 can be formed from, for example, a suitably shaped metal bar that is attached via any suitable means (e.g., welded) to CPD 100.

In one embodiment, CPD 100 is formed from any suitable metal including, but not limited to, steel, stainless steel, aluminum, titanium, copper, nickel, or alloys that containing one or more of the above listed metals.

Regarding lip 106, although lip 106 is depicted as a flat piece of material, lip 106 is not limited thereto. Instead lip 106 can be any shape (e.g., a rectangular or square bar) that permits operative engagement between lip 106 and, for example, catalyst block holding tray 112 so as to ensure the proper long term placement of CPD 100. Given the placement of CPD 100, particulate matter is not permitted, or able, to pass between the interior surface of wall 110 and catalyst block holding tray 112. In FIG. 1, catalyst block hold tray holds an SCR catalyst block 120.

Figure 1A:
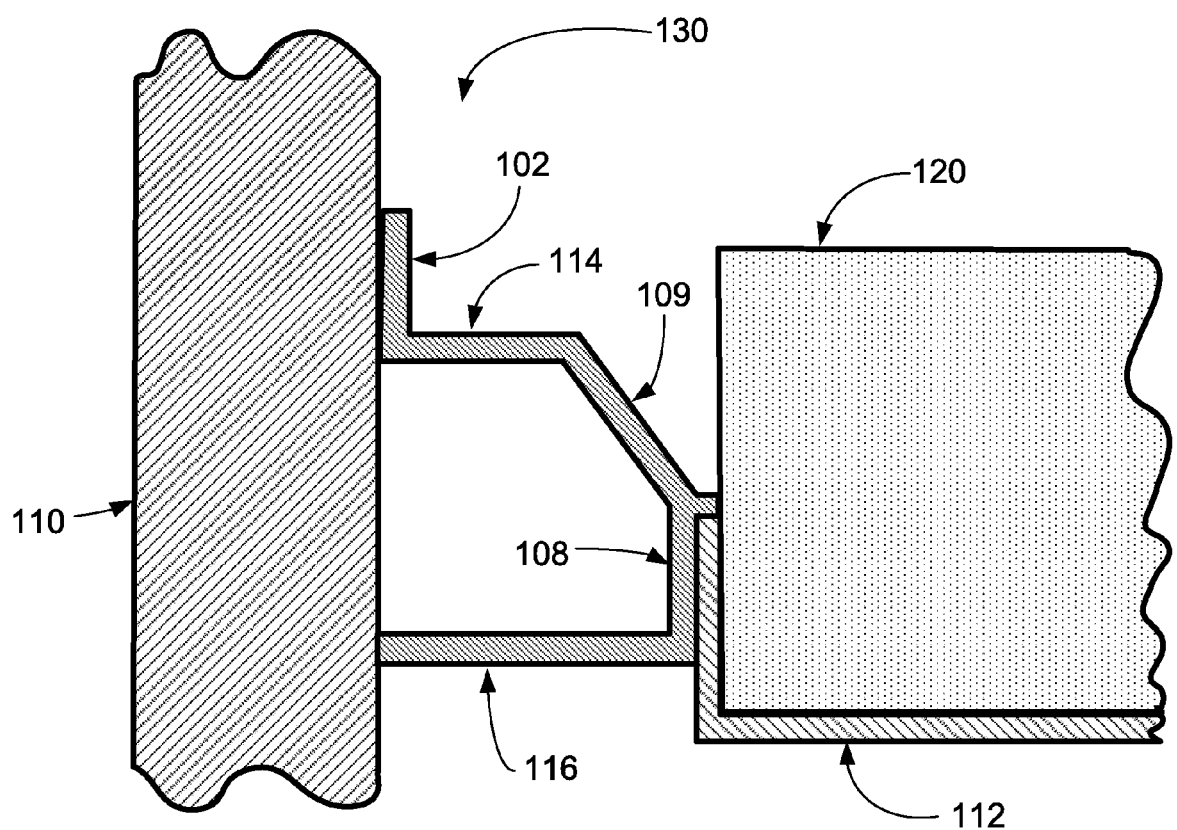
FIG. 1A is an illustration of a wall mounted particulate diverter according to an alternative embodiment of the present invention.

In an alternative embodiment, the tension portion 104 may be comprised of one or more elements. FIG. 1A illustrates such and alternative embodiment of a catalytic particulate diverter 130 wherein tension portion comprises two elements, horizontal tensions element 114 and angled tension element 109. As would be appreciated by one of skill in the art, multiple additional tensions element combination are possible without deviating from the teachings and scope of the present invention.

In another embodiment, a CPD according to the present invention is designed to create a seal, or particulate diverting means, between at least two adjacent catalyst blocks, where such blocks are located on different support means (e.g., catalyst block holding trays 112). An example of such an embodiment is detailed in FIG. 2.

Figure 2:
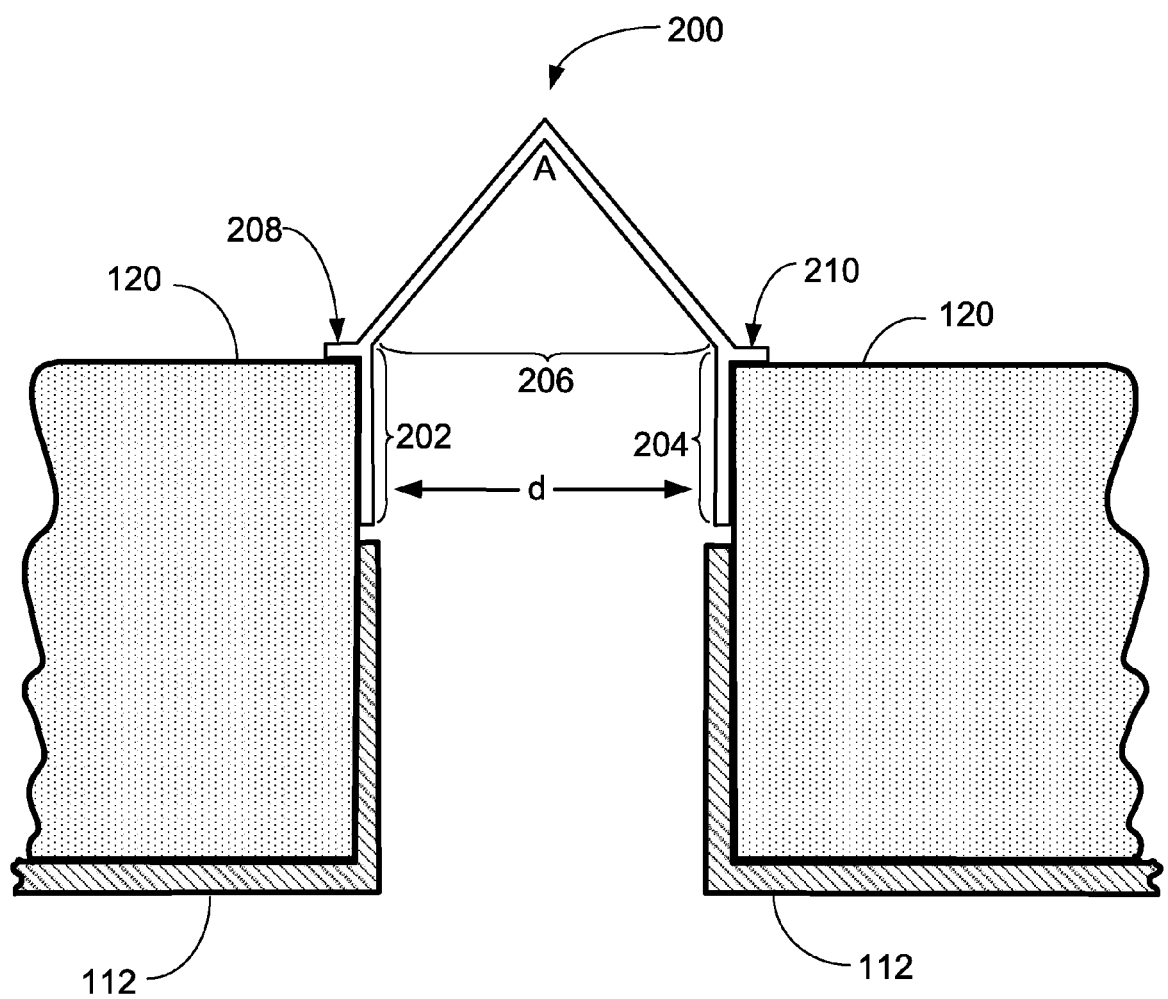
FIG. 2 is an illustration of a catalyst block mounted particulate diverter according to one embodiment of the present invention.

Turning to FIG. 2, a second embodiment of a CPD 200 comprises two anchoring portions 202 and 204 that are attached at opposite ends of a V-shaped tensioning portion 206, and two lips 208 and 210 located at the respective interfaces between V-shaped tensioning portion 206 and anchoring portions 202 and 204. Lips 208 and 210 are integrally connected to CPD 200 in any suitable position so as to operatively engage a catalyst block 120 in order to maintain the position of CPD 200 between two adjacent catalyst blocks 120. In operation, CPD 200 operatively engages adjacent surfaces of two adjacent catalyst blocks 120 via anchoring portions 202 and 204, and the tension generated by V-shaped tensioning portion 206.

Tension is generated by CPD 200 due to the fact the resting arc A of CPD 200 is greater than arc A when CPD 200 is placed between adjacent catalyst blocks 120. In other words, uninstalled CPD 200 has a greater distance "d" between anchoring portions 202 and 204 than installed CPD 200. In one embodiment, resting arc A has an angle of about 75 to about 150 degrees, or from about 100 to about 130 degrees, or even from about 110 to about 125 degrees.

In an alternative embodiment, a gasket material may be placed between the anchor portion 202 and catalyst block 120, or between anchor portion 204 and catalyst block 120 to reduce the rate of particulate matter leakage past the CPD 200.

CPD 200 is generally assembled from one or more pieces of metal via any suitable assembly process (welding, brazing, riveting, adhesive, etc.) to yield a desired shape that can be tension mounted, as noted above, between two adjacent catalyst blocks in, for example, an SCR enclosure. In one embodiment, CPD 200 is formed from a single sheet of metal that is suitably bent to yield CPD 200. In another embodiment, CPD 200 can be formed from a single sheet of metal that is suitably bent to yield all the elements of CPD 200 except for lips 208 and 210. In this embodiment, lips 208 and 210 can be formed from, for example, a suitably shaped metal rod that is attached via any suitable means (e.g., welded) to CPD 200.

In one embodiment, CPD 200 is formed from any suitable metal including, but not limited to, steel, stainless steel, aluminum, titanium, copper, nickel, or alloys that contain one or more of the above listed metals.

Regarding lips 208 and 210, although lips 208 and 210 are depicted as a flat piece of material, lips 208 and 210 are not limited thereto. Instead lips 208 and 210 can be any shape that permits operative engagement between lips 208 and 210 and, for example, catalyst blocks 120 so as to ensure the proper long term placement of CPD 200. Given the placement of CPD 200, the ability for particulate matter to pass between adjacent catalyst blocks 120 is restricted.

In still another embodiment, a CPD according to the present invention is designed to create a seal, or particulate diverting means, between at least two adjacent catalyst blocks, where such blocks are located on the same support means (e.g., catalyst block holding tray 112). This embodiment is detailed in FIG. 3.

Figure 3:
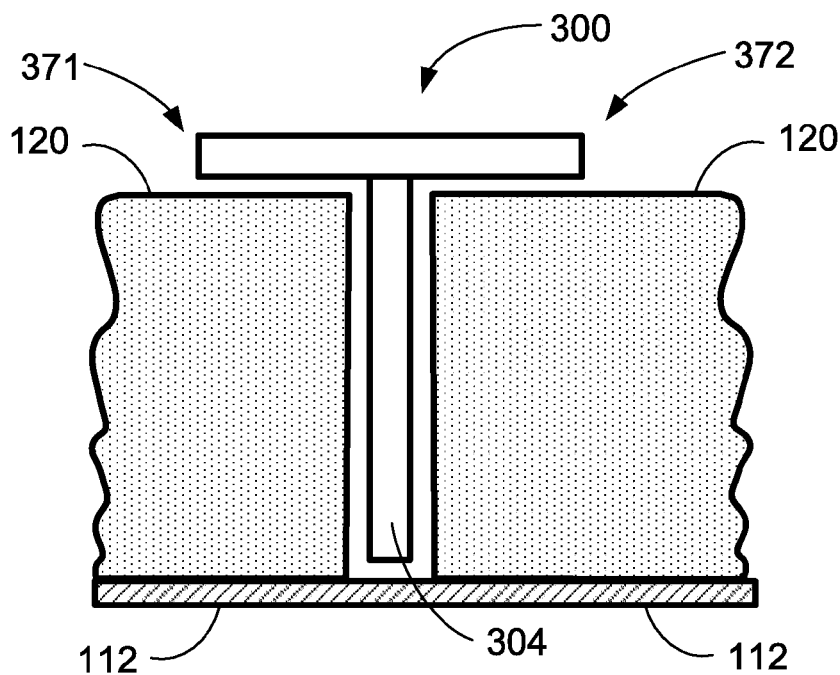
FIG. 3 is an illustration of a catalyst block mounted particulate diverter according to alternative embodiment of the present invention.

Turning to FIG. 3, an alternative embodiment of a CPD 300 comprising anchoring portion 304 is centrally attached to flat bar 370 forming a T-shape. Flat bar portion has a first end 371 a second end 372, the first end 371 and second end 372 of the flat bar portion 370 maintaining contact with at least one surface of adjacent catalysts blocks 120, anchor portion 304 comprising of at least two sides being operatively joined to the flat bar portion 307 between the first end 371 and second end 372, wherein opposite sides of the anchoring portion are maintained in close proximity or contact with at least one surface of adjacent catalyst blocks 120. Width of anchor 304 is selected to optimally space adjacent catalytic blocks at a predetermined distance apart from on another. In operation, CPD 300 operatively diverts particulate matter away from the spaces between adjacent catalyst blocks.

Figures 4, 5:
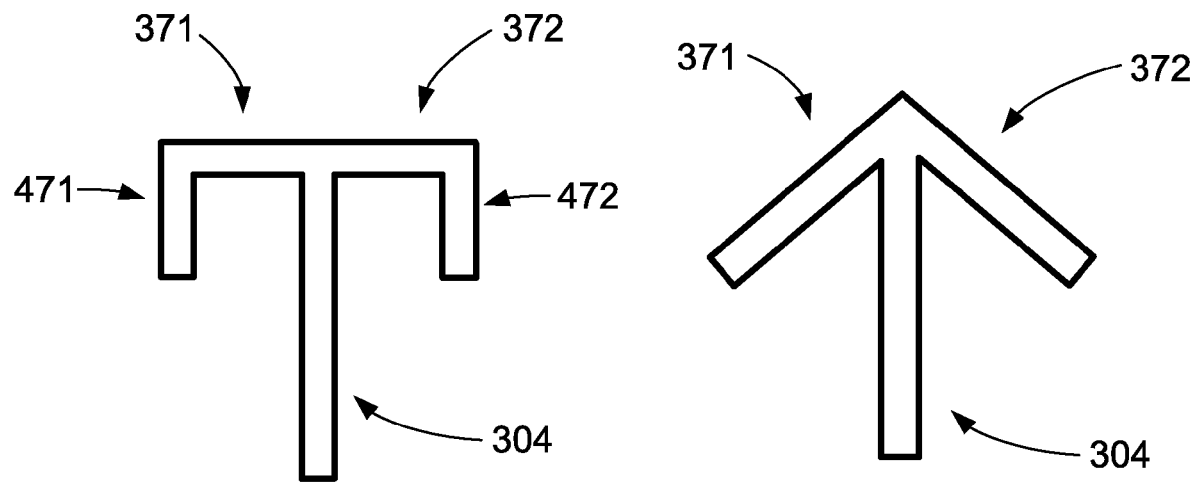
FIG. 4 is an illustration of a catalyst block mounted particulate diverter according to another alternative embodiment of the present invention.
FIG. 5 is an illustration of a catalyst block mounted particulate diverter according to yet another alternative embodiment of the present invention.

In an alternative embodiment, FIG. 4., T-shaped portion may contain additional tabs or legs 471, 472 extending downward from first and second ends 371, 372 of flat bar portion 370.

In yet another alternative embodiment, FIG. 5., first and second ends 371, 372, may be position at an angle of less than 90 degrees relative flat bar portion 370.

CPD 300 is generally assembled from one or more pieces of metal via any suitable assembly process (welding, brazing, riveting, adhesive, etc.) to yield a desired shape that can be tension mounted, as noted above, between two adjacent catalyst blocks in, for example, an SCR enclosure. In one embodiment, CPD 300 is formed from a single sheet of metal that is suitably bent to yield CPD 300. In another embodiment, CPD 300 can be formed from a single sheet of metal that is suitably bent to yield all the elements of CPD 300.

In one embodiment, CPD 300 is formed from any suitable metal including, but not limited to, steel, stainless steel, aluminum, titanium, copper, nickel, or alloys that containing one or more of the above listed metals.

It will thus be appreciated that the CPDs of the present invention provide numerous advantages:
  allows screen removal without destroying the gas diverter;
  allows catalyst block removal without destroying the gas diverter;
  significantly reduces initial installation time, labor and expense;
  significantly reduces subsequent outage time, labor and expense;
  provides an ash seal between the catalyst and the casing and/or between catalyst blocks;
  minimizes field welding while promoting push-in-place and drop-in-place installation;
  re-usable;
  minimal in field trimming; pieces are sized per application and not supplied in bulk strip lengths;

spring action design of several embodiments of the CPDs easily establishes the initial seal and maintains it throughout operating and maintenance conditions;

drop-in design of another embodiment allows it to be cut to length; no field trimming from longer bulk lengths;

self-adjusting sizing; no re-bending to adjust for block position inaccuracies;

reduced installation time resulting in reduced electric utility outage time;

weld spatter risk is reduced because the limited welding requirement is performed before the catalyst is present; and weld removal risk is reduced because flame cutting or grinding is not required to remove the strips.

The spring loaded embodiment of FIG. 1 bridges the gap between the catalyst blocks and adjacent casing; they are installed before the catalyst blocks are loaded into the SCR and maintain good contact with the catalyst blocks. The embodiment of FIG. 2 is installed in the wide gap between catalyst blocks, while the embodiment of FIG. 3 is installed in the narrow gap; both can be installed after the entire array of blocks are all in place or while the array is being placed. The latter two embodiments are pre-engineered to length for fast and easy drop-in installation, and minor dimensional changes will permit the CPDs to be adapted to any vendor's catalyst block design.

While specific embodiments of the present invention have been shown and described in detail to illustrate the application and principles of the invention, it will be understood that it is not intended that the present invention be limited thereto and that the invention may be embodied otherwise without departing from such principles. For example, V-shaped tensioning portion 206 could be replaced by a tensioning portion having an alternative shape, such as a U-shaped tensioning portion. Thus, while the present invention has been described above with reference to particular means, materials, and embodiments, it is to be understood that this invention may be varied in many ways without departing from the spirit and scope thereof, and therefore is not limited to these disclosed particulars but extends instead to all equivalents within the scope of the following claims.

What is claimed is:

1. A particulate diverter comprising:
    a wall-contacting portion having a first end and a second end, the wall-contacting portion being designed to operatively engage at least one wall surface;
    a tensioning portion having a first end and a second end, the first end of the tensioning portion being operatively joined to the second end of the wall-contacting portion, and where the tensioning portion is designed to maintain contact between the at least one wall surface and the wall-contacting portion, and
    an L-shaped anchor having a first end and a second end, the first end of the L-shaped anchor being operatively joined to the second end of the tensioning portion, and where the L-shaped anchor is designed to prevent dislodging of the particulate diverter,
    wherein the combination of the wall-contacting portion, the tensioning portion and the L-shaped anchor portion form a particulate diverter that is capable of diverting particulate matter.

2. The particulate diverter of claim 1, wherein the particulate diverter further comprises a second anchoring means selected from one or more lips or one or more channels.

3. The particulate diverter of claim 2, wherein the particulate diverter further comprises a lip, where the lip is located at the junction of the second end of the tensioning portion and the first end of the L-shaped anchor.

4. The particulate diverter of claim 1, wherein the particulate diverter is formed from a metal selected from steel, stainless steel, aluminum, titanium, copper, nickel, or alloys that containing one or more of the above listed metals.

5. The particulate diverter of claim 4, wherein the particulate diverter is formed from a single sheet of steel.

6. The particulate diverter of claim 1, wherein tension is created due to the interaction between the wall-contacting portion and the tensioning portion, and where the angular relationship of the second end of the wall-contacting portion and the first end of the tensioning portion is about 100 to about 150 degrees.

7. The particulate diverter of claim 1, wherein the tension portion comprise a bend between the first end and the second end.

* * * * *